US009110686B2

(12) United States Patent
McCormack et al.

(10) Patent No.: US 9,110,686 B2
(45) Date of Patent: Aug. 18, 2015

(54) WEB CLIENT COMMAND INFRASTRUCTURE INTEGRATION INTO A RICH CLIENT APPLICATION

(75) Inventors: Michael J. McCormack, Snohomish, WA (US); Nicholas James Thomson, Redmond, WA (US); Andrew Nathan Magee, Issaquah, WA (US); Navin Ishwar Thadani, Bothell, WA (US); Shashi Ranjan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 647 days.

(21) Appl. No.: 12/796,448

(22) Filed: Jun. 8, 2010

(65) Prior Publication Data
US 2011/0302487 A1 Dec. 8, 2011

(51) Int. Cl.
G06F 17/00 (2006.01)
G06F 9/44 (2006.01)
G06F 9/445 (2006.01)
G06Q 30/02 (2012.01)

(52) U.S. Cl.
CPC ............... G06F 9/4443 (2013.01); G06F 8/76 (2013.01); G06F 9/44505 (2013.01); G06Q 30/02 (2013.01)

(58) Field of Classification Search
CPC ............................ G06F 9/4443; G06F 9/44505
USPC .......................... 715/234, 239, 243, 248–249
See application file for complete search history.

(56) References Cited

U.S. PATENT DOCUMENTS

| 2007/0005634 | A1* | 1/2007 | Selca et al. ..................... 707/102 |
| 2007/0055943 | A1* | 3/2007 | McCormack et al. ......... 715/746 |
| 2007/0143165 | A1* | 6/2007 | Roberts et al. ..................... 705/8 |
| 2008/0147625 | A1* | 6/2008 | Altounian et al. ................ 707/4 |
| 2008/0280588 | A1* | 11/2008 | Roundtree et al. ............ 715/764 |
| 2009/0327912 | A1* | 12/2009 | Gassner et al. ............... 715/744 |
| 2011/0223945 | A1* | 9/2011 | Bhatnagar ..................... 455/466 |

OTHER PUBLICATIONS

Backbase Enterprise Ajax 4.3.1 JSF Edition Component Development Guide; accessed at: http://download.backbase.com/docs/jsf/current/Component%20Development%20Guide.pdf; accessed on Apr. 13, 2010, 46 pages.
Goldthorpe et al; Adding Help Support to a Rich Client Application, Sep. 10, 2007, 7 pages.
Loepp et al; GeoStratSys Desktop Technical Overview; accessed at: http://www.geostratsys.org/Documents/DetailedTechSpcs.pdf; accessed on Apr. 13, 2010, 3 pages.
Sah, Rahul; Developing Rich Client Apps with Eclipse, Mar. 3, 2009, 6 pages.

(Continued)

*Primary Examiner* — Chau Nguyen
(74) *Attorney, Agent, or Firm* — Damon Rieth; Danielle Johnston-Holmes; Micky Minhas

(57) ABSTRACT

A command interface for a software application is implemented on a client computer. A first definition of the command interface is received from a server computer. The first definition includes rules for encoding the command interface on a web browser. A conversion of the first definition to a second definition is performed. The second definition includes language for encoding the command interface on a user interface of the software application. The second definition is used to render the command interface on the user interface of the software application.

10 Claims, 11 Drawing Sheets

(56) References Cited

OTHER PUBLICATIONS

SharePoint 2010; accessed at: http://www.724hosting.com/SHAREPOINT/PORTAL/sharepoint2010.htm?mainMenuItemToSlide=5; accessed on Apr. 13, 2010, 2 pages.
Layering, MartinFowler.com; accessed at: http://kostas.homeip.net/reading/Software%20Development/Design%20Patterns/Patterns%20of%20Enterprise%20Application%20Architecture/layers.html; accessed on Apr. 13, 2010, 7 pages.
Terp-Nielsen, Karsten Schulz; J2EE-Web-Development, accessed at: http://www.iprod.auc.dk/~kaj/slies/oracle/WebDevelopment.ppt; accessed on Apr. 13, 2010, 58 pages.

* cited by examiner

502 — <ribbon>
  504 — <tab name = "Accounts">
    512 — <group name = "Records Management">
      516 — <button name = "Edit">
      518 — <button name = "Activate">
    </group>
    514 — <group name = "Actions">
      520 — <button name = "Assign">
      522 — <button name = "Sharing">
    </group>
  </tab>
  506 — <tab name = "Views">
  </tab>
  508 — <tab name = "Create Related">
  </tab>
  510 — <tab name = "Customize">
  </tab>
</ribbon>
```

WEB CLIENT COMMAND INFRASTRUCTURE INTEGRATION INTO A RICH CLIENT APPLICATION

BACKGROUND

Application software can be run on a plurality of systems and interfaces. For example, customer relationship management (CRM) systems assist in the management of a company's interactions with clients and sales prospects and customer information regarding products, services and customer accounts. Online customer relationship management software provides a business applications platform for customer relationship management, typically using a client/server model. Using an online CRM system, a user at a client computer is able to access CRM information from a server computer and display CRM information at the client computer.

Client-based CRM software can often be integrated into application software on a client computer, providing a user a commonly used platform from which to access CRM information. However, different versions of the application software often include different user interfaces. Differences between the versions of applications used to access CRM information can lead to incompatibility issues and inconsistent functionality between interfaces.

SUMMARY

Embodiments of the disclosure are directed to a method for implementing a command interface for a software application on a client computer. A first definition of the command interface is received from a server computer. The first definition includes rules for encoding the command interface on a web browser. A conversion of the first definition to a second definition is performed. The second definition includes language for encoding the command interface on a user interface of the software application. The second definition is used to render the command interface on the user interface of the software application.

The details of one or more techniques are set forth in the accompanying drawings and the description below. Other features, objects, and advantages of these techniques will be apparent from the description, drawings, and claims.

DESCRIPTION OF THE DRAWINGS

FIG. 5 shows an example portion of an XML file to which a conversion program can be applied.

DETAILED DESCRIPTION

The present application is directed to systems and methods for integrating information from a web-based infrastructure into a rich client software application, such as a messaging application on a client computer.

Messaging applications from different manufacturers may have different user interfaces. In addition, the user interface of different versions of a software application from the same manufacturer may be different. For example, one user interface may include a command bar and another user interface may include a ribbon. With the systems and methods of the present disclosure, a conversion program on the client computer converts information, for example CRM information, from a web-based infrastructure to a format compatible with the user interface of the software application being used on the client computer, for example the messaging application. Other software applications may used.

Figure 2:
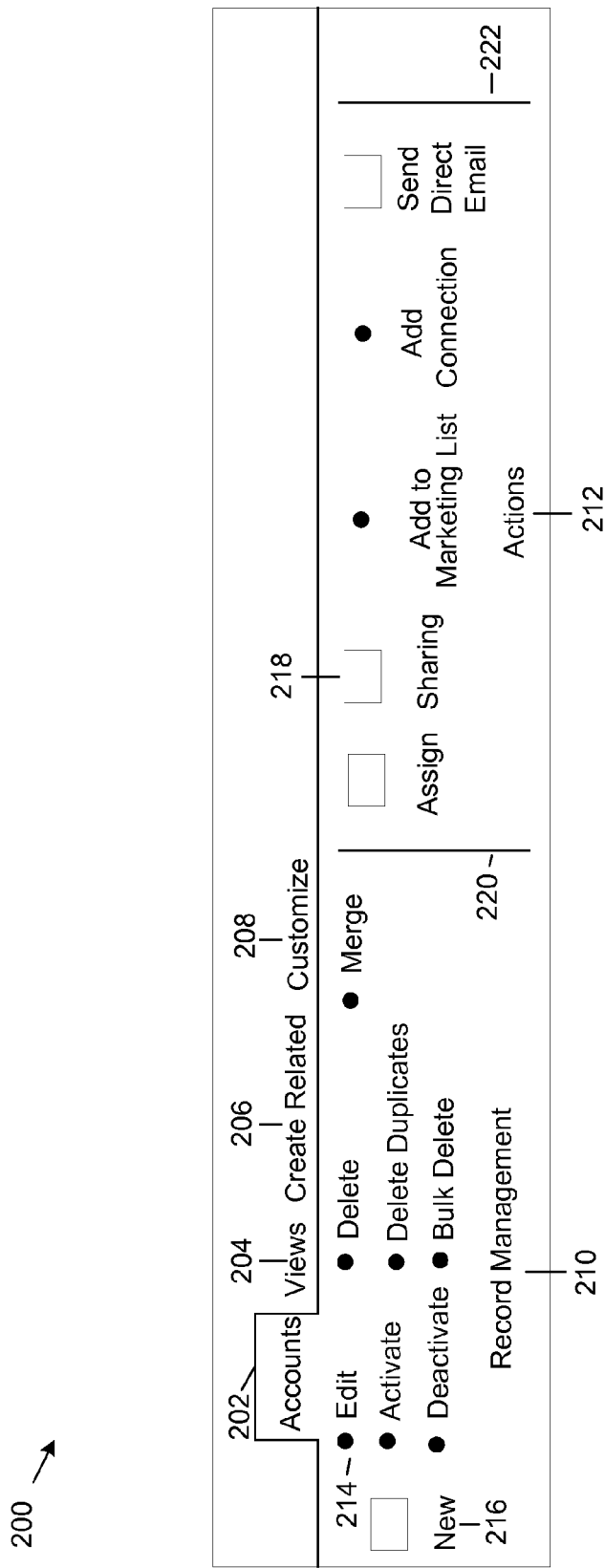
FIG. 2 shows an example ribbon that can be rendered on a client computer or FIG. 1.

A ribbon user interface, hereinafter referred to as a ribbon, is a user interface in which a set of buttons are placed on tabs in a tab bar. An example ribbon is shown in FIG. 2 and explained later in this disclosure.

Figure 4:
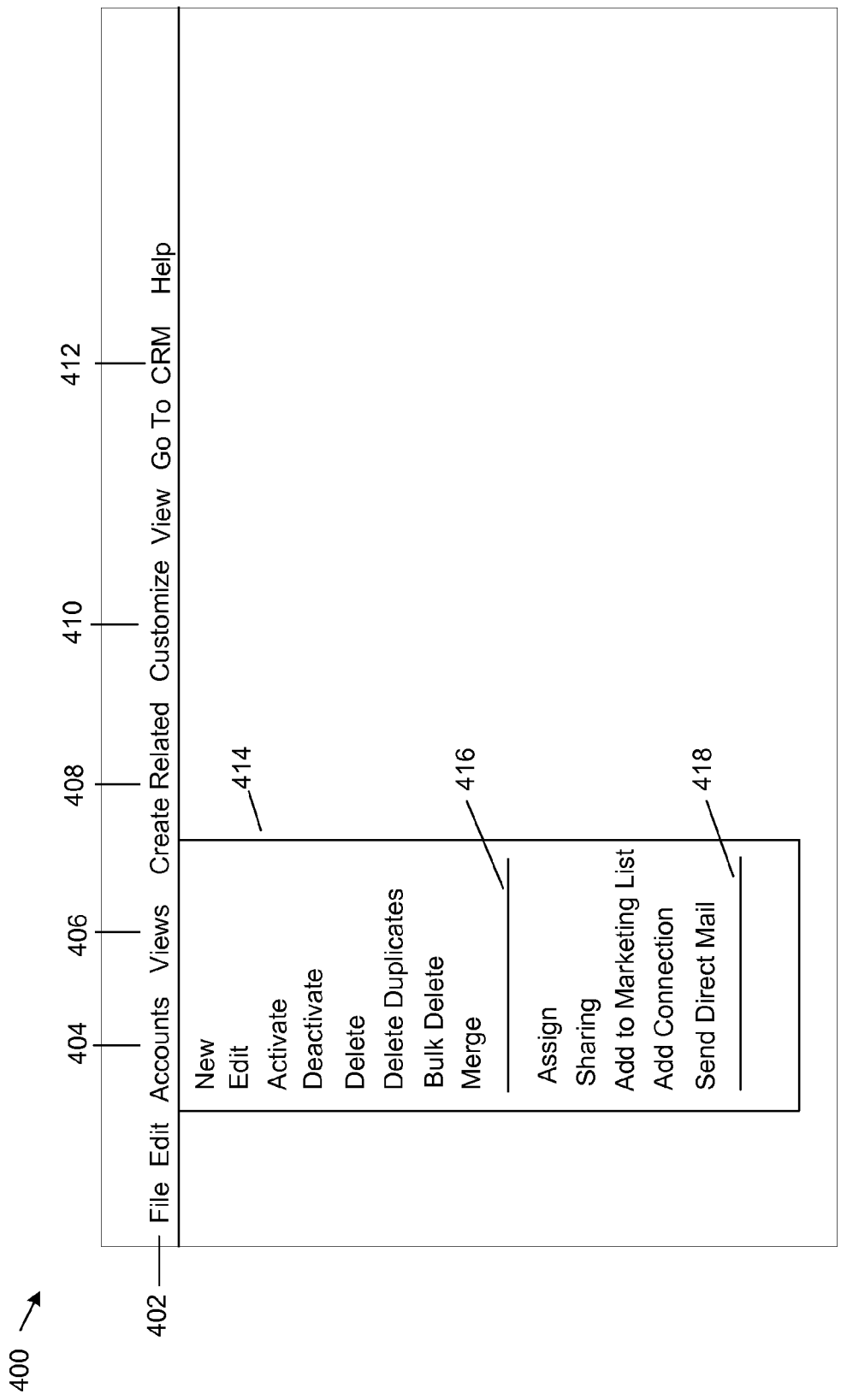
FIG. 4 shows an example command bar that can be rendered on a client computer of FIG. 1.

A command bar user interface, hereinafter referred to as a command bar, is a menu driven user interface that includes menu and submenu items and toolbars. An example command bar is shown in FIG. 4 and explained later in this disclosure.

Figure 1:
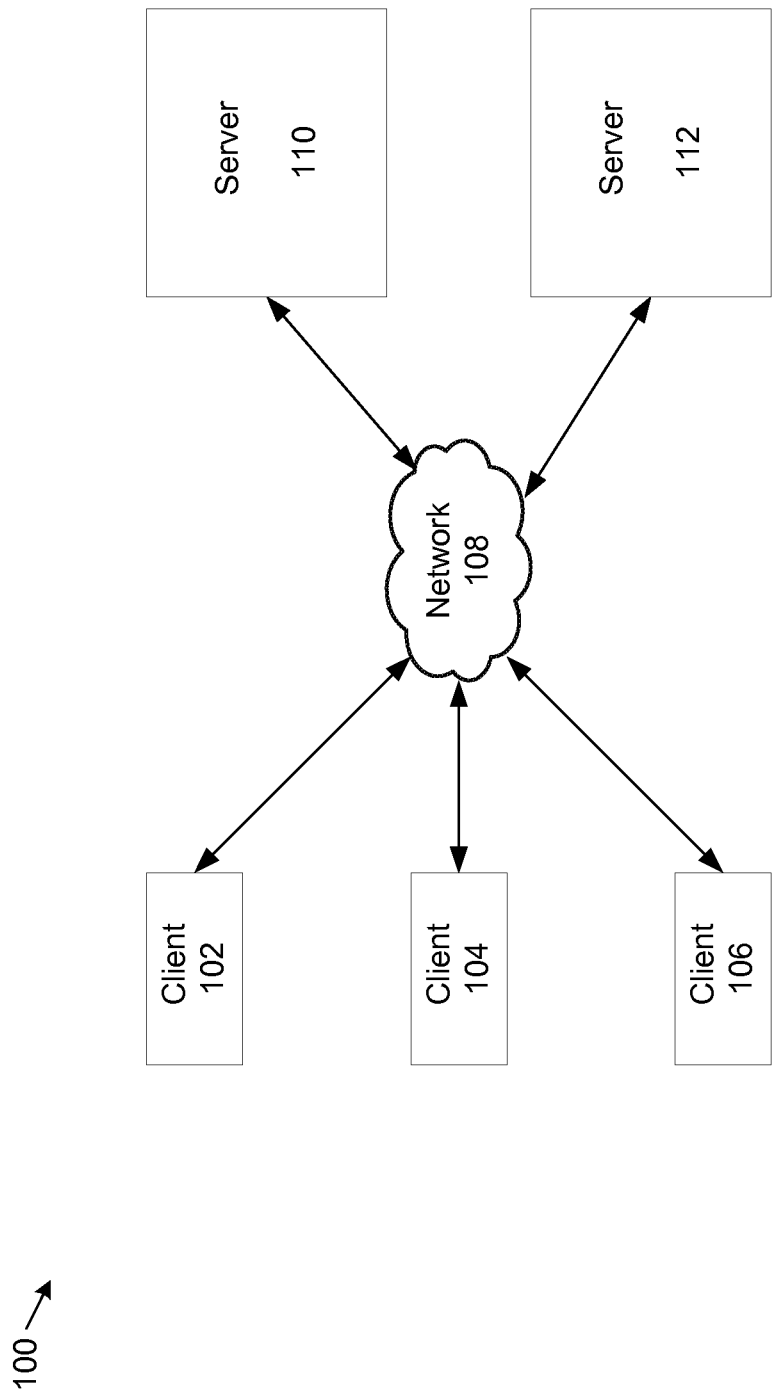
FIG. 1 shows an example system that supports integrating CRM information from a web-based infrastructure to a rich client software application.

FIG. 1 shows an example system 100 that supports integrating CRM information from a web-based infrastructure to a rich client software application, for example a messaging application. A rich client is a client computer that has some resources, for example memory, installed on the client computer but also depends on resources distributed over a network.

The example system 100 includes client computers 102, 104, 106, network 108 and server computers 110, 112. Client computer 102 includes web browser software, such as the Microsoft Internet Explorer® web browser from Microsoft Corporation of Redmond, Wash. Client computer 104 includes software, such as the Microsoft Office Outlook® 2010 messaging and collaboration software from Microsoft Corporation of Redmond, Wash., that provides email application software for client computer 104. An email application is one example of a messaging application. The example email application software for client computer 104 includes a ribbon-based user interface. Client computer 106 includes software, such as the Microsoft Office Outlook® 2007 messaging and collaboration software from Microsoft Corporation of Redmond, Wash., that also provides email application software for client computer 106. However, the example email application software for client computer 106 includes a command bar user interface.

Server computers 110, 112 include CRM software such as Microsoft Dynamics® CRM 5.0 customer relationship management software from Microsoft Corporation of Redmond, Wash. that provides CRM functionality. Files and data located on server computers 110, 112 are accessible to client computers 102, 104, 106 through network 108.

One example of network 108 is a corporate Intranet network. More or fewer client computers, networks and server computers may be used. Client computers 102, 104 and 106 are configured to obtain the name and location of a server computer, for example server computer 110 or server computer 112 and obtain CRM information from the server computer. The CRM information includes a definition file that defines the format and structure of a CRM command interface, typically a ribbon or a command bar, that is rendered on client computers 102, 104 and 106.

Using web browser software, for example the Microsoft Internet Explorer® web browser on client computer 102, one or more screens of CRM information can be obtained from server computer 110 and rendered as a web page on client computer 104. The CRM information displayed on the web page of client computer 102 typically includes lists of customer information including, account information, marketing information, product information, sales information, service information and related items. In addition, each page of CRM information may include a command definition, providing one or more commands that a user may execute regarding the CRM information. Example commands are edit accounts or view accounts or add a marketing list to an account. Other commands are possible.

FIG. 2 shows an example web client ribbon 200 that can be rendered on a client computer, for example on client computer 102, when CRM information from server computer 110 is displayed as a web page on client computer 102. The example web client ribbon 200 includes one or more tabs 202, 204, 206, 208, one or more groups 210, 212, one or more separators 220, 222 separating the one or more groups, and one or more command buttons for each group. The groups 210, 212 and buttons for each group shown in FIG. 2 correspond to the example Accounts tab 202. When a different tab is selected, for example the Views tab 204, the Create Related tab 206 or the Customize tab 208 is selected, a different set of groups, buttons and separators is rendered.

CRM information can also be integrated into a messaging and collaboration software application on a client computer and rendered on the user interface of the messaging and collaboration software application. For example, using the messaging and collaboration software installed on client computer 104, for example the Microsoft Office Outlook® 2010 messaging and collaboration software, and using a CRM software program for the client computer 104, for example the Microsoft Dynamics® CRM 5.0 for Outlook® customer relationship management software, CRM information from server computer 110 can be integrated with the messaging and collaboration software. The CRM information is displayed in one or more grids on the user interface of the messaging and collaboration software on client computer 104.

A grid is an area of the user interface, typically a series of columns and rows, in which email messages, lists, etc. are displayed. When the CRM information is displayed on a client-based software application such as the Microsoft Office Outlook® 2010 messaging and collaboration software, the rendering of the CRM information conforms to the format used by the client-based software application. For example, when the messaging and collaboration software provides a ribbon interface, the CRM information is rendered in the form of a ribbon. When the messaging and collaboration software provides a command bar interface, the CRM information is rendered in the form of a command bar.

Figure 3:
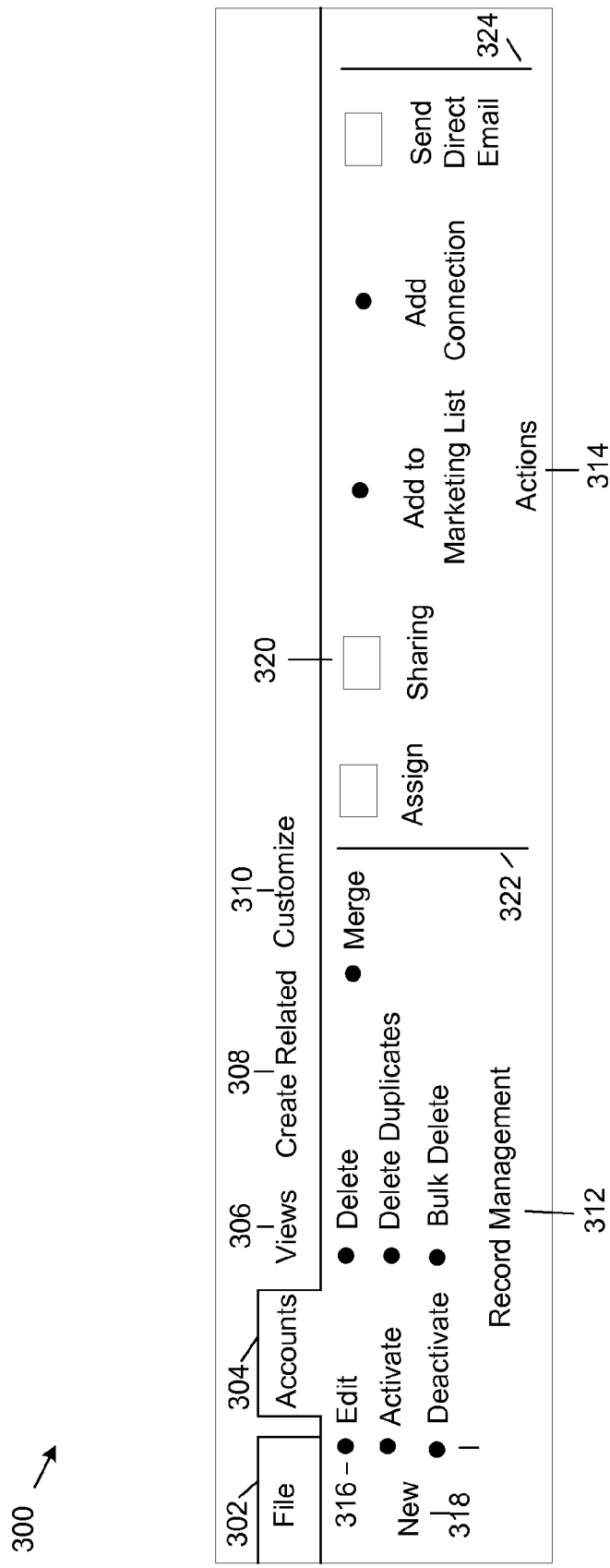
FIG. 3 shows another example ribbon that can be rendered on a client computer of FIG. 1.

FIG. 3 shows an example rich client ribbon 300 that can be rendered on client computer 104. The example rich client ribbon 300 appears similar to the example web client ribbon 200. However, although the names of the tabs, groups and buttons are the same, one or more tabs, groups and buttons may be added to rich client ribbon 300 or deleted from rich client ribbon 300. In addition, the style or more or more buttons may be differed.

For example, the rich client ribbon 300 includes one additional tab, the example File tab 302 that is not included in the web client ribbon 200. As another example, the New button 216 is shown as an icon in the example web client ribbon 200, but the New button 318 is shown without an icon in the example rich client ribbon 300. In examples, when the web client ribbon 200 is rendered on other client-based software applications, there may be additional differences.

For example, one or more tabs, groups or buttons from the ribbon web client ribbon 200 may not be used in rich client ribbon 300 or on a user interface of other client-based software applications and one or more tabs, groups or buttons from rich client ribbon 300 or the user interface of other client-based software applications may not be used on the example web client ribbon 200. Furthermore, as discussed later in this disclosure, markup command language statements included in command definitions for the example web client ribbon 200 and for the example rich client ribbon 300 are different.

The example rich client ribbon 300 includes one or more tabs 302, 304, 306, 308, 310, one or more groups 312, 314, one or more separators 322, 324 separating the one or more groups, and one or more command buttons for each group. The groups 312, 314 and buttons for each group shown in FIG. 3 correspond to the example Accounts tab 304. When a different tab is selected, for example the Views tab 306, the Create Related tab 308 or the Customize tab 310 is selected, a different set of groups, buttons and separators is rendered.

FIG. 4 shows an example command bar 400 representing the implementation of the example web client ribbon 200 on the example user interface of the messaging and collaboration software on client computer 106. Because the messaging and collaboration software application installed on client computer 106, for example the Microsoft Office Outlook® 2007 messaging and collaboration software, does not support a ribbon-based interface, a conversion program is needed to convert the example web client ribbon 200 to the example command bar 400. The conversion program, discussed later in this disclosure, results in the example command bar 400.

The example command bar 400 includes a menu 402 which includes menu items File, Edit, Accounts, Views, Create Related, Customize, View, Go To, CRM and Help. The Accounts 404, Views 406, Create Related 408, Customize 410 and CRM 412 menu items are added to the command bar 400 when customer relationship management software, for example the Microsoft Dynamics® CRM 5.0 for Outlook® customer relationship management software, is installed on client computer 106. The Microsoft Dynamics® CRM 5.0 for Outlook® customer relationship management software is typically installed as a plug-in software module to the messaging and collaboration software, for example the Microsoft Office Outlook® 2007 messaging and collaboration software, already installed on client computer 106.

When the Accounts 402 menu item is selected, an example drop-down accounts submenu 414 is displayed. The example drop-down accounts submenu 414 includes submenu items corresponding to the groups, buttons and separators of the example web client ribbon 200. For example, the accounts submenu 414 includes the buttons New, Edit, Activate, Delete, Delete Duplicates, and Merge that are included in the example Records Management 210 group. The accounts submenu 414 also includes the buttons Assign, Sharing, Add to Marketing List, Add Connection and Send Direct Mail that are included in the example Actions 212 group.

The structure and format of the example web client ribbon 200 and rich client ribbon 300 and the example command bar 400 are each specified in a definition file comprised of markup language. The definition file is obtained from a server computer, for example server computer 110, typically when client computers 102, 104 and 106 are configured. The markup language comprises a series of statements that specify how to encode the ribbons and the command bar electronically. Typically, the Extensible Markup Language (XML) is the markup language used in the definition files. In this disclosure, the terms markup language and XML are used interchangeably.

Because the user interface on the server computer is dynamic, the web client ribbon 200 may change after client computers 102, 104 and 106 are configured. Consequently, the rich client ribbon 300 is periodically refreshed. Therefore, the definition file for the rich client ribbon 300 is updated periodically. The updates occur typically via polling, or via periodic updates from the server computer, for example server computer 110, 112. The definition file for the example web client ribbon 200 and for the example rich client ribbon 300 each include versioning information. During polling or during periodic updates from the server computer 110, 112, the version of the definition file is checked. A new definition file is downloaded when the current definition file is not the latest version.

The structure and format of the example web client ribbon 200 is consistent with the structure and format of XML used to render the CRM information as a web page on the web browser, for example the Microsoft Internet Explorer® web browser, on client computer 102. The example rich client ribbon 300 is consistent with the structure and format of XML used in the message and collaboration software, for example the Microsoft Office Outlook® 2010 messaging and collaboration software, running on client computer 104.

The example command bar 400 is consistent with the structure and format of XML used in the message and collaboration software, for example the Microsoft Office Outlook® 2007 messaging and collaboration software, running on client computer 106. Because the structure and format of XML is typically different for these different software applications, a conversion program is used to convert the XML from the structure and format of the web client ribbon 200 rendered on client computer 102 to the structure and format of the rich client ribbon 300 rendered on client computer 104. The conversion program is also used to convert the XML from the structure and format of the web client ribbon 200 rendered on client computer 102 to the structure and format of the command bar 400 rendered on client computer 106. The conversion program is designed such that the same conversion program that is used to convert web client ribbon 200 to rich client ribbon 300 can be used to convert web client ribbon 200 to command bar 400.

The conversion program is installed on client computer 104 when CRM software, for example the Microsoft Dynamics® CRM 5.0 for Outlook® customer relationship management software, is installed on client computer 104 and the conversion program is installed on client computer 106 when the CRM software, for example the Microsoft Dynamics® CRM 5.0 for Outlook® customer relationship management software, is installed on client computer 106. The objective is to have one definition for a web page ribbon that can be converted both to a rich client ribbon and to a rich client command bar.

Although the examples described disclose how a web page ribbon is converted to a rich client command bar, other conversion examples are possible. In general, the conversion program uses a common source and converts the common source to a second definition. In the examples discussed, the common source defines a ribbon interface and the second definition defines either a ribbon interface or a command bar interface. In other examples, the common source may define a command bar interface and the second definition may define a ribbon interface or another command bar interface. Furthermore, one or more additional file conversions may be performed. For example, the second definition may be converted to a third definition and so on.

In the definition of a ribbon interface, for example web ribbon interface 200, tabs, groups and buttons form distinct groupings. For example, accounts tab 202 is a grouping that includes the record management 210 group sub grouping and the actions 212 group sub grouping. Similarly, the record management 210 group sub grouping includes a sub grouping of elements including Edit button 214 and New button 216. Similarly, in the definition of a command bar interface, for example command bar interface 400, menu items form groupings. For example, the Accounts 404 menu item is a grouping that includes sub grouping of submenu commands, each grouping of submenu commands being separated by a separator, such as separators 416 and 418.

FIG. 5 shows an example portion of an XML file 500, corresponding to the web client ribbon 200, to which the conversion program can be applied. The XML file 500 corresponds to a ribbon structure that includes CRM related tabs for accounts, views, create related and customize. The XML file 500 includes an example ribbon tag 502. Within the structure of the ribbon tag 502, the XML file 500 includes an example accounts tab tag 504, an example views tab tag 506, an example create related tab tag 508 and an example customize tab tag 510.

The accounts tab tag 502 includes the records management group tag 512 and the actions group tag 514. The records management group tag 512 includes the edit button tag 514 and the activate button tag 518. The actions group tag 514 includes the sharing button tag 520 and the share this record button tag 522. Because FIG. 5 only shows a portion of an XML file 500, tags for other tabs, groups and buttons are not shown in FIG. 5.

The ribbon tag, tab tags, group tags and button tags are arranged in an ordered hierarchy in the example XML file 500. For example, the ribbon tag 502 is at the top of the hierarchy and the accounts tab tag 504 and the view tab tag 506 are included within the ribbon tag 502 hierarchy. As another example, the records management group tag 512 and the actions group tag 514 are included within the hierarchy of the accounts tab tag 504. In addition, the edit button tag 516 and the activate button tag 518 are included within the hierarchy of the records management group tag 512.

In addition, the example XML file 500 may include one or more rule tags, not shown, that define one or more rule attributes for one or more tab elements, group elements and button elements in the XML file 500. In examples, the one or more rule attributes specify whether the one or more tab elements, group elements and button elements are to be rendered on a web client ribbon only or on a rich client only.

In examples, a rich client includes messaging and collaboration software. For example, if a button is to be rendered only on the web client ribbon, for example the web client ribbon 200 on client computer 102, the XML definition for the button includes a rule tag specifying web client only. Similarly, if a button is to be rendered only on client 104 or 106, the button includes a rule tag specifying rich client only. In examples, different terms may be used to specify web client only or rich client only. Typically, if a tab, group or button is to be rendered on both a web client, such as client computer 102 and a rich client, such as client computer 104 or client computer 106, the rule tag is not included for the tab element, group element or button element in the XML file.

The XML statements shown in the example XML file 500 are simplified for discussion purposes. An actual XML file typically includes more detail. For example, the following is an example portion of an XML file for the example web client ribbon 200 for a records management group:

```
<Group
  Id="account|NoRelationship|HomePageGrid|Mscrm.HomepageGrid.
  account.MainTab.Management"
  Command="account|NoRelationship|HomePageGrid|Mscrm.Enabled"
  Sequence="10" Title="Record Management" Description="Record
  Management"
  Template="Mscrm.Templates.FourOverflow">
```

The following is an example portion of an XML file for the example rich client ribbon 300 for the same records management group:

```
<group
  id="Mscrm.Mscrm.HomepageGrid._EntityLogicalName_.MainTab.
  Management_4"
  tag="_EntityLogicalName_|NoRelationship|HomePageGrid|Mscrm.
  HomepageGrid._EntityLogicalName_.MainTab.
  Management$$$_EntityLogicalName_|NoRelationship|HomePageGrid|
  Mscrm.Enabled" label="Record Management"
  image="/_imgs/logo_16.gif" getVisible="HrExplorerGroupGetVisible">
```

When the conversion program runs, the portion of the XML file for the records management group for the web client ribbon 200 is converted to the format for the records management group for the example rich client ribbon 300.

The following is an example portion of an XML file for the example web client ribbon 200 for the edit button in the records management group:

```
<Button
  Id="account|NoRelationship|HomePageGrid|Mscrm.HomepageGrid.
  account.MainTab.Management.Edit" ToolTipTitle="Edit"
  ToolTipDescription="Edit this Account."
  Command="account|NoRelationship|HomePageGrid|Mscrm.
  EditSelectedRecord"
  Sequence="50" LabelText="Edit" Alt="Edit"
  Image16by16="/_imgs/placeholders/ribbon_placeholder_16.png"
  Image32by32="/_imgs/ribbon/edit32.png" TemplateAlias="o2" />
```

The following is an example portion of an XML file for the example rich client ribbon 300 for the edit button in the records management group:

```
<button
  id="Mscrm.Mscrm.HomepageGrid._EntityLogicalName_.MainTab.
  Management.Edit_4"
  tag="_EntityLogicalName_|NoRelationship|HomePageGrid|Mscrm.
  HomepageGrid._EntityLogicalName_.MainTab.Management.
  Edit$$$_EntityLogicalName_|NoRelationship|HomePageGrid|Mscrm.
  EditSelectedRecord" label="Edit"
  screentip="Edit" image="/_imgs/placeholders/ribbon_placeholder_16.png"
  getEnabled="HrExplorerButtonGetEnabled"
  getVisible="HrExplorerButtonGetVisible"
  onAction="HrExplorerButtonOnAction" />
```

When the conversion program runs, the portion of the XML file for the edit button for records management group for the web client ribbon 200 is converted to the format for the edit button for the records management group for the example rich client ribbon 300.

The conversion program is part of the CRM software, for example the Microsoft Dynamics® CRM 5.0 for Outlook® customer relationship management software, that is installed on client computers 104 and 106. Before the conversion program runs on client computer 104, the CRM software on client computer 104 obtains the XML file for the web ribbon client 200 from server computer 110. The conversion program then converts the XML file for the web client ribbon 200 to an XML file having the format and structure for the rich client ribbon 300.

Before the conversion program runs on client computer 106, the CRM software on client computer 106 also obtains the XML file for the web ribbon client from server computer 110. However, the conversion process on client computer 106 is a two-step process. First the conversion program on client computer 106 converts the XML file for the web client ribbon 200 to an XML file having the format and structure for the rich client ribbon 300. Then, the conversion program on client computer 106 converts the XML file for the rich client ribbon 300 to an XML file for the command bar 400. The conversion program identifies the version of messaging and collaboration software on client computer 104 and on client computer 106 in order to determine the conversions to be made.

When the conversion program runs, the XML file for the web client ribbon 200 is parsed and all tags are identified. When converting the XML file for the web client ribbon 200 to the XML file for rich client ribbon 300, each identified tag in the XML file for the web client ribbon 200 is converted to the format for a similar tag in the XML file for the rich client ribbon 300.

For example, referring to FIG. 5, when parsing the XML file for the web client ribbon 200, the conversion program identifies tag 502 for the ribbon, tags 504, 506, 508 and 510 for the tabs, tags 512 and 514 for the groups and tags 516, 518, 520 and 522 for the buttons. Each tag also includes one or more attributes. For example, each tab, group and button has a name attribute. The conversion program also identifies the name attributes for each tag. The actual name of each tag gets preserved during the conversion process. However, the format and names of the other attributes may change.

For example, the group names Record Management and Actions from the web client ribbon 200 are preserved in the rich client ribbon 300. Similarly the button names of Edit, Activate, Assign and Sharing from the web client ribbon 200 are preserved in the rich client ribbon 300. However, from the XML snippet above, the tool tip description of "Edit this Account" for the edit button for the web client ribbon 200 is changed in the conversion process to a tool tip of "Edit" for the edit button for the rich client ribbon 300. In this example, the conversion program uses the name of the button for the name of the tool tip.

The conversion program also identifies one or more rule tags included in the XML file. The rule tags constitute metadata that identify rules for certain actions in the conversion process. For example, rules determine whether one or more buttons from the web ribbon client are to be included in the rich client ribbon 300. A rule corresponding to a rule tag may cause the conversion program to look for a certain button and change the style of the button, for example from one icon to another. A rule may also look for a certain button and determine that the button is not to be included in the rich client ribbon 300. In addition, a rule may specify that one or more tabs not included in the web client ribbon 200, for example the File tab 302, are to be included in the rich client ribbon 300. Other examples or rules are possible.

The conversion program also merges certain server computer and client computer commands. For example, the web client ribbon 200 includes a Views tab 204, the rich client ribbon 300 includes a Views tab 306 and the rich client command bar 400 includes a Views tab 406. When converting the web client ribbon 200 to the rich client ribbon 300, commands in the Views tab 204 of web client ribbon 200 are merged with the commands of the Views tab 306 in the rich client ribbon 300. In examples, when commands in the Views tab 204 have the same name as commands in the Views tab 306, the commands in the Views tab 306 appear first in the merged Views tab 306. In a similar manner, when converting web client ribbon 200 to the rich client command bar 400, commands in the Views tab 204 are merged with commands in the Views tab 406.

When the conversion program runs on client computer 106, because the example Microsoft Office Outlook® 2007 messaging and collaboration software running on client computer 106 does not support ribbons, an additional conversion may be performed to convert the XML file for the rich client ribbon 300 to an XML file for the example command bar 400. When the conversion program is run to convert the XML file for the rich client ribbon 300 to the XML file for the command bar 400, the XML file for the rich client ribbon 300 is parsed and each tag in the XML file for the rich client ribbon 300 is identified. Each identified tag is converted to a corresponding menu or submenu 414 item in the command bar 400.

For example, the Accounts tab 304 is converted to the Accounts menu item 404 on the command bar 400. In addition, each button for the Accounts tab 304 is converted to a submenu item under the Accounts menu item 404. Groups are delineated by separators, for example separators 416 and 418. For example, the buttons New, Edit, Activate, Deactivate, Delete, Delete Duplicates, Bulk Delete and Merge for the Record Management group 312 are converted to submenu items New, Edit, Activate, Deactivate, Delete, Delete Duplicates, Bulk Delete and Merge in the Accounts submenu 414. In addition, following separator 416, marking the end of the record management group, the buttons Assign, Sharing, Add to Marketing List, Add Connection and Send Direct Mail for the Actions group 314 are converted to submenu items Assign, Sharing, Add to Marketing List, Add Connection and Send Direct Mail in the Accounts submenu 414.

The part of the conversion program that converts the ribbon into the command bar uses hard coded application programming interface (API) commands to implement the conversion process. The API commands are typically commands provided in a developer kit to implement such functions as creating a menu, adding an item to a menu, creating a submenu, adding a name to a submenu, adding a separator, etc. The API commands also implement functions such as expanding a menu item into multiple submenu items or collapsing multiple submenu items into one item. Other commands with similar functionality are possible. The exact syntax of the commands is dependent on the messaging and collaboration software, for example the Microsoft Office Outlook® 2007 messaging and collaboration software, installed on client computer 106.

The CRM software on client computer 104 and on client computer 106, for example the Microsoft Dynamics® CRM 5.0 customer relationship management software, implements execution of commands in rich client ribbon 300 and command bar 400 via an interpretive layer in the CRM software. The interpretive layer makes use of code already written for the web client ribbon 200 so that a single source can be used and so that new execution code does not need to be written for each messaging and collaboration software user interface. The code to implement the web client ribbon 200 is obtained from server computer 110 by client computer 104 and by client computer 106 before the conversion process is executed. The interpretive layer, typically using JavaScript, maps or translates a user action on rich client ribbon 300 or command bar 400 to web client ribbon 200 code for implementing the action.

For example, when the user presses New button 318 or the user presses the New submenu item from the Accounts submenu 414, the interpretive layer maps the action into code used in the web client ribbon 200 for a New command, for example code that is executed when the user presses the New button 216 for web client ribbon 200 on client computer 102. When the interpretive layer maps the action for pressing New button 318 or New submenu item from the Accounts submenu 414, a new window is opened on client computer 104 and client computer 106, respectively.

The use of the code for web client ribbon 200 effectively makes use of a hidden window on client computer 104 and client computer 106. The hidden window corresponds to the non rendering of web client ribbon 200. That is, the definition file for web client ribbon 200 is obtained from server computer 110 is stored on client computer 104 and on client computer 106. However, the web client ribbon 200 is not rendered on client computer 104 or on client computer 106. Instead, the commands associated with web client ribbon 200 are interpreted by the messaging and collaboration software on client computer 104 and 106. For example, when a button is clicked on web client ribbon 200, the messaging and collaboration software on client computer 104 recognizes the button as a customized control. A command interpreter in the messaging and collaboration software executes the button click through the hidden window, typically using JavaScript. The result of the button click may be passed back to the command interpreter via the hidden window for further action. A hidden window may be also be used with other user interfaces, such as a command bar. Thus, a hidden window may be used to map commands from one or more user interfaces into common execution code.

Figure 6:
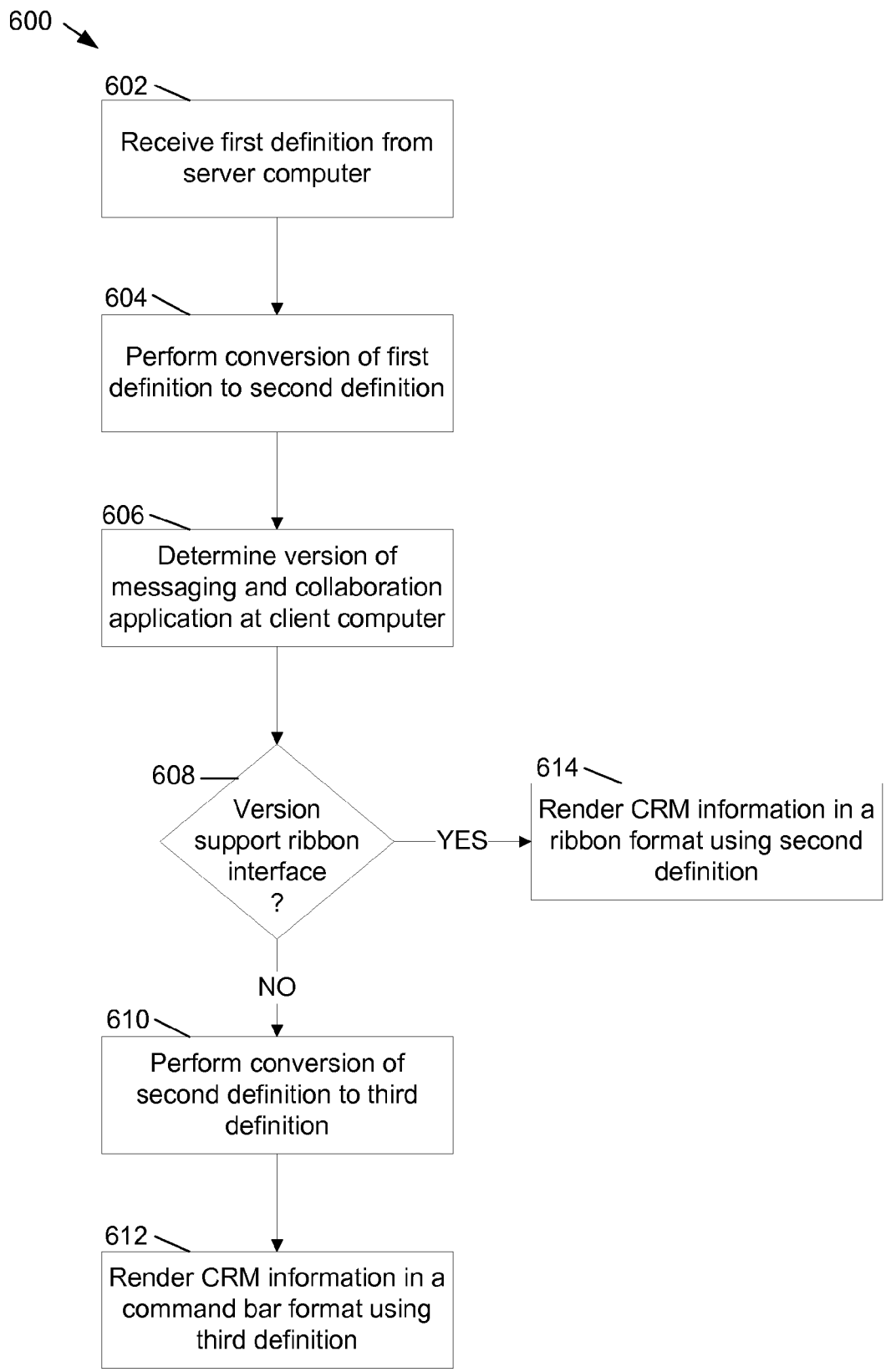
FIG. 6 shows a flowchart of an example method for integrating CRM information from a web-based infrastructure into a messaging application on a client computer of FIG. 1.

FIG. 6 shows an example flowchart 600 for integrating CRM information from a web-based infrastructure into a messaging application on a client computer. The CRM information is obtained from a server computer, for example server computer 110, and integrated into a messaging application on a client computer that supports a ribbon interface, for example client computer 104 or integrated into a client computer that supports a command bar interface, for example client computer 106.

At operation 602 a first definition file is obtained from server computer 110. The first definition file, typically an XML file, includes a first definition of CRM information that can be rendered as a ribbon on a client computer, for example on client computer 102. When the first definition file is rendered on client computer 102, the CRM information is displayed as a web page on client computer 102 and the ribbon, for example web client ribbon 200, shown in FIG. 2, is typically rendered at the top of the web page.

At operation 604, a conversion is performed at client computer 104 to convert the first definition to a second definition. The second definition conforms to the definition format used on client computer 104. In the example flowchart 600, client computer 104 supports a ribbon interface and provides the capability of rendering the CRM information from the first definition file as a ribbon on client computer 104. Client computer 104 also runs software for a messaging and collaboration application such as the Microsoft Office Outlook® 2010 messaging and collaboration software. In addition, client computer 104 runs software such as Microsoft Dynamics® CRM 5.0 for Outlook® customer relationship management software for integrating CRM information into the Microsoft Office Outlook® 2010 messaging and collaboration software.

Even though the Microsoft Office Outlook® 2010 messaging and collaboration software supports a ribbon interface, the format of markup language definitions for the ribbon interface on the Microsoft Office Outlook® 2010 user interface is different from the format of markup language definitions used to render the CRM information as a web page on client computer 102. The conversion performed at operation 604 converts the format of the CRM information from server computer 110 to a format in which the CRM information can be rendered on client computer 104. The conversion process at operation 604 is explained in more detail later in this disclosure.

At operation 606, the version of the messaging and collaboration software running at the client computer is determined. In this example, client computer 104 runs the Microsoft Office Outlook® 2010 messaging and collaboration software and client computer 106 runs the Microsoft Office Outlook® 2007 messaging and collaboration software. The Microsoft Office Outlook® 2010 messaging and collaboration software supports a ribbon interface and the Microsoft Office Outlook® 2007 messaging and collaboration software supports a command bar interface.

At operation 608, when it is determined that the messaging and collaboration software running at the client computer supports a ribbon interface, for example when is determined that the messaging and collaboration software on client computer 104 is the Microsoft Office Outlook® 2010 messaging and collaboration software, at operation 614, the CRM information is rendered as a ribbon using the second definition.

At operation 608, when it is determined that the messaging and collaboration software running at the client computer does not support a ribbon interface, for example when it is determined that the messaging and collaboration software on client computer 106 is the Microsoft Office Outlook® 2007 messaging and collaboration software, at operation 610 a second conversion is performed to convert the second definition to a third definition. The third definition defines the markup format for rendering the CRM information as a command bar on the user interface of the messaging and collaboration software running on client computer 106. The conversion process at operation 610 is explained in more detail later in this disclosure. At operation 612, the CRM information is rendered as a command bar using the third definition.

Figure 7:
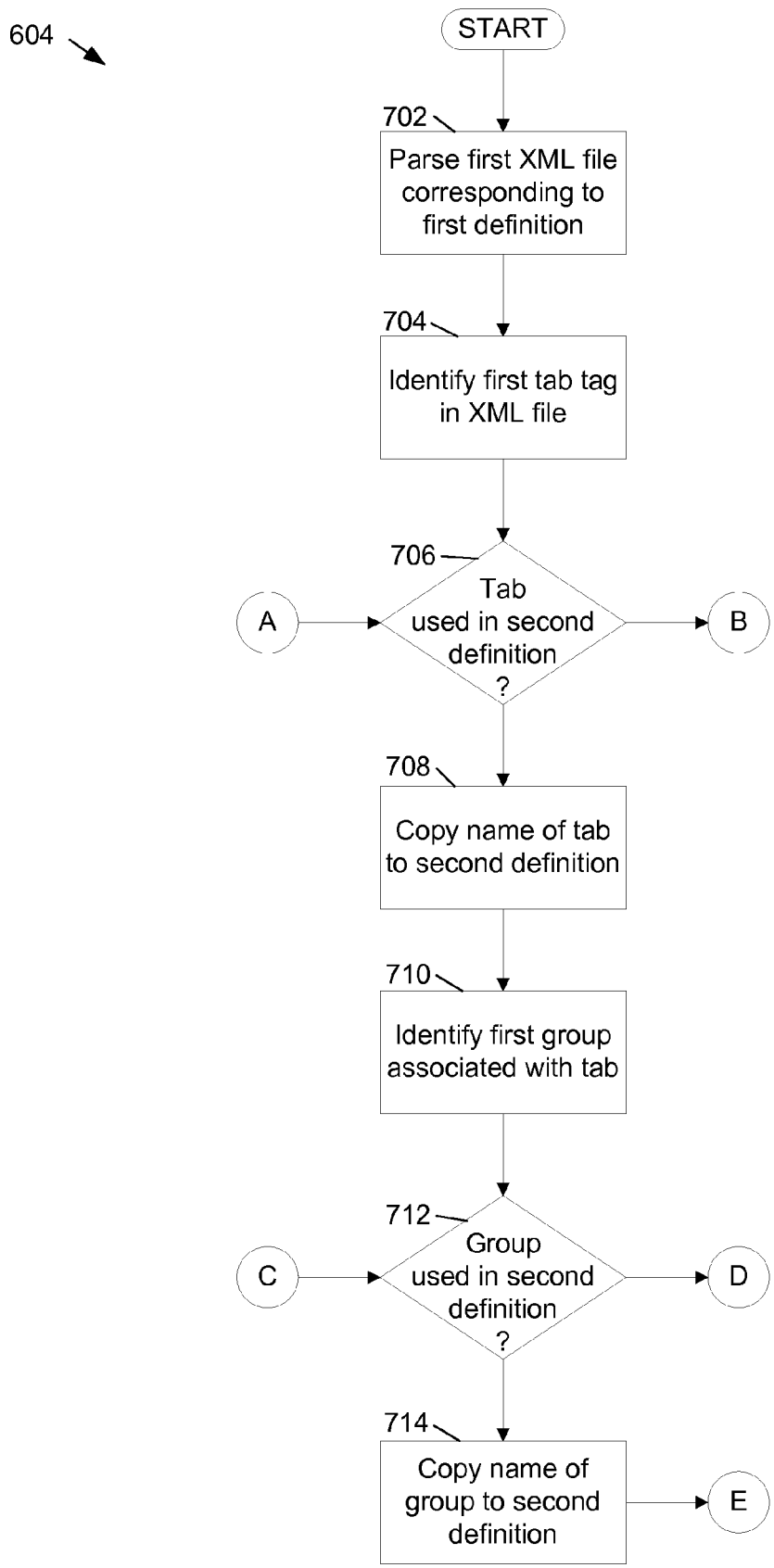
FIGS. 7 and 8 show a flowchart of an example method for converting a first definition of ribbon-based user interface to a second definition of the ribbon-based user interface.
Figure 8:
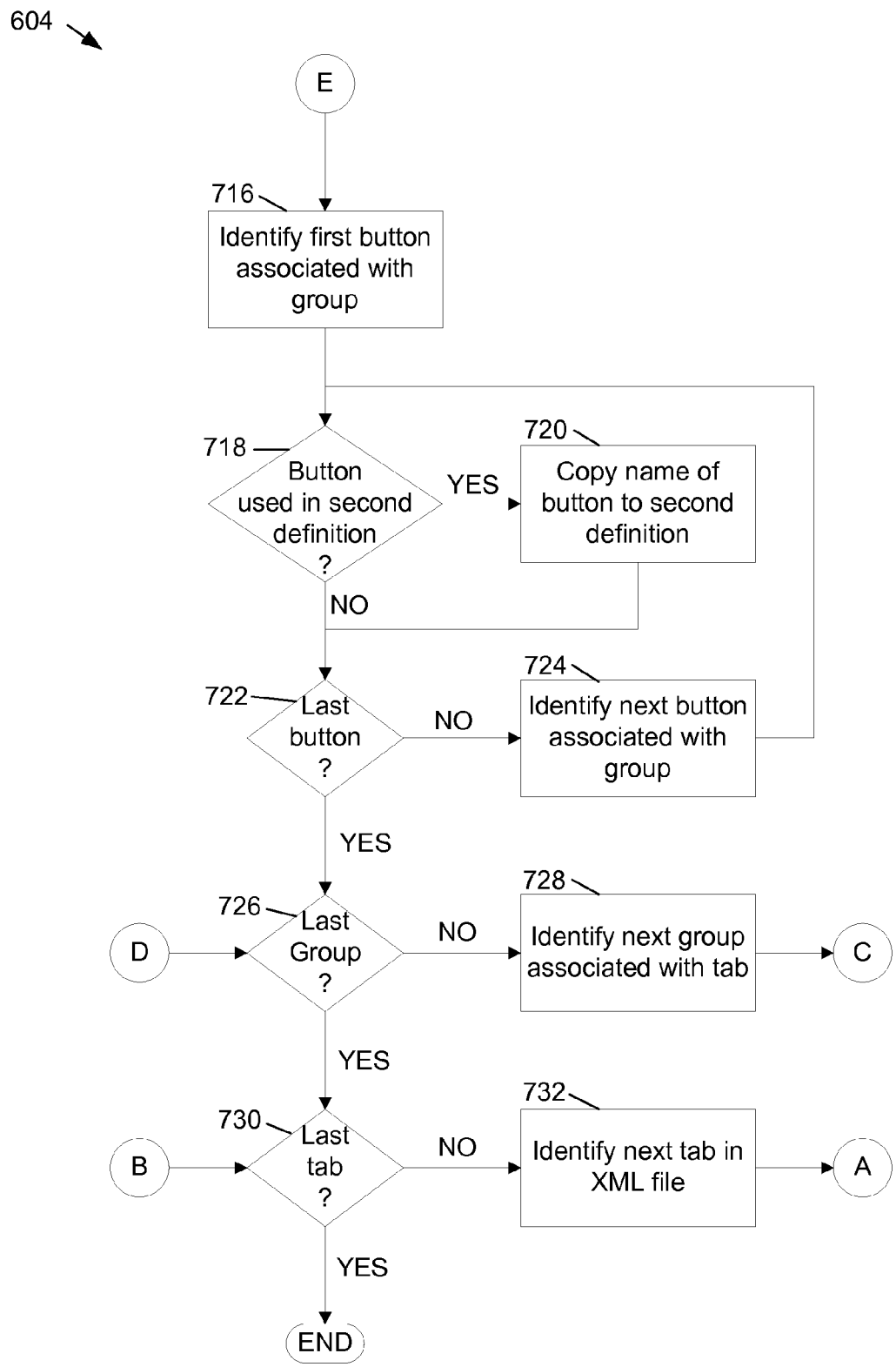

FIGS. 7 and 8 show an example flowchart illustrating additional details of operation 604 for conversion of the first definition to the second definition. The first definition corresponds to the format of a ribbon interface for a web client ribbon, such as a ribbon rendered on client computer 102. The second definition corresponds to the format of a ribbon interface for a ribbon that is rendered in the user interface of messaging and collaboration software running on a client computer, such as client computer 104.

At operation 702, the first definition is parsed. The first definition is included in a first XML file obtained from server computer 110. At operation 704, a first tab tag is identified in the first XML file. The first tab tag defines the first tab in the web client ribbon. At operation 706, a determination is made as to whether the first tab is used in the ribbon to be rendered on client computer 104. Sometimes a tab, group or button used on the web client ribbon is not used on the ribbon rendered on client computer 104. Similarly, sometimes a tab, group or button on the ribbon rendered on client computer 104 is not used on the web client ribbon. Whenever a tab, group or button is used on one ribbon but not on another, the definition of a tag includes a rule attribute that indicates whether the tab, group or button is to be used.

For example, when the first tab is not be rendered on the messaging and collaboration software ribbon, a rule attribute specifying "web only" may be included with the first tab tag in the first definition. In examples, other designations may be used instead of "web only". Similarly, when the first tab is only to be rendered on the messaging and collaboration software ribbon, a rule attribute specifying "Outlook® only" may be included with the first tab tag in the first definition. In examples, other designations may be used instead of "Outlook® only".

When it is determined at operation 706 that the first tab is to be used in the second definition, at operation 708, the name of the first tab is copied to the second definition. The conversion algorithm used in the conversion process looks for tab, group and button elements and when it is determined that those elements are used in the second definition, the names of the elements are copied to the second definition. The second definition includes markup language, typically XML, that corresponds to the format of the messaging and collaboration software, for example the Microsoft Office Outlook® 2010 messaging and collaboration software, used on client computer 104.

When the first tab is used in the second definition, the second definition also includes a first tab tag. Typically, the markup language syntax used in the first definition is different than the markup language syntax used in the second definition. However, the names of each tag element used in both the first and second definitions is the same. During the conversion process, when it is determined that a tag in the first definition is to be included in the second definition, the tag name for the first definition is copied to the corresponding tag element in the second definition.

At operation 706, when it is determined that the first tab is not to be used in the second definition, control advances to operation 730. At operation 730, a determination is made as to whether the current tab, in this case the first tab, is the last tab in the first XML file. When it is determined at operation 730 that the current tab is not the last tab in the first XML file, at operation 732, the next tab in the first XML file is identified. Control then passes back to operation 706 where a determination is made as to whether the next tab is used in the second definition.

At operation 708, a first group that is associated with the tab of operation 706 is identified. For example, for the example accounts tab 202, the first group is the records management 210 group. At operation 712, a determination is made as to whether the first group is to be included in the second definition. Typically, the first group is included in the second definition unless a rule tag is included in the first group element in the first definition. When the rule tag specifies that the first group is for web ribbon only, the first group is not included in the second definition.

When a determination is made at operation 712 that the first group is to be included in the second definition, at operation 714, the name of the second group is copied to the second definition. As discussed above with regard to the first tab, the syntax used in the markup language for the second group in the second definition may be different than the syntax used in the first definition. However, when the first group is included in the second definition, the name of the first group in the second definition is the same as the name of the first group in the first definition.

When a determination is made at operation 712 that the first group is not be included in the second definition, control advances to operation 726. At operation 726, a determination is made as to whether the first group is the last group in the first tab. When it is determined at operation 726 that the first group is not the last group in the first tab, at operation 728, the next group included in the first tab is identified. Control then passes back to operation 712 where a determination is made whether the next group is included in the second definition.

At operation 716, a first button that is associated with the first group is identified. At operation 718, a determination is made as to whether the first button is to be included in the second definition. Similar to the first tab and the first group, when the first button is not to be included in the second definition, the first button element in the first definition includes a rule tag that specifies that the first button is to be included the web ribbon only.

When a determination is made at operation 718 that the first button is included in the second definition, at operation 720, the name of the first button is copied to the second definition. As discussed with regard to the first tab and the first group, when a button element is to be included in the second definition, the syntax of the markup language for the button element in the second definition is typically different than the syntax of the markup language for the button element in the first definition. However, the caption of the button element is the same in both the first definition and the second definition.

When a determination is made at operation 718 that the first button is not to be included in the second definition, at operation 722, a determination is made as to whether the button is the last button in the first group. When a determination is made at operation 722 that the first button is not the last button in first group, control advances to operation 724 and the next button in the first group is identified. Control then passes to operation 722 where a determination is made as to whether the next button is to be included in the second definition.

When it is determined at operation 722 that the current button is the last button in the first group, at operation 726 a determination is made as to whether the current group, in this case the first group, is the last group in the current tab, in this case the first tab. When it is determined at operation 722 that the current group is the last group in the current tab, at operation 730, a determination is made as to whether the current tab is the last tab in the first XML file. When it is determined that the current tab is the last tab in the first XML file, the conversion process ends.

Figure 9:
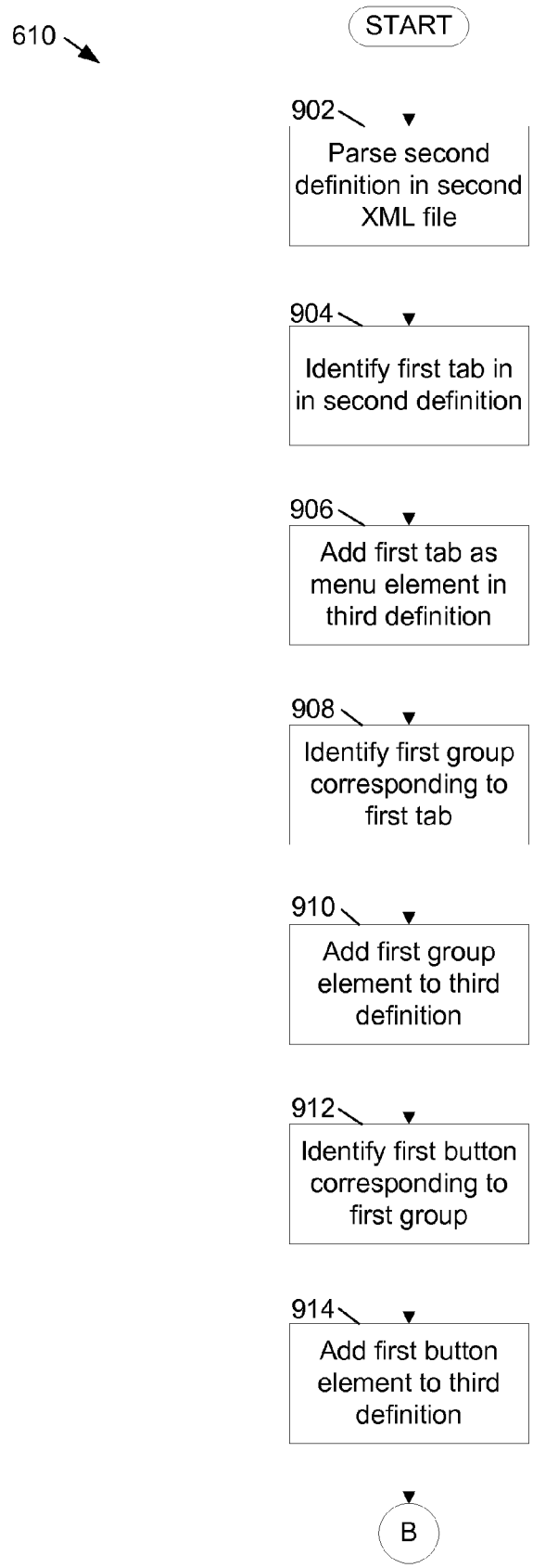
FIGS. 9 and 10 show a flowchart of an example method for converting the second definition of the ribbon-based user interface to a command-bar definition.
Figure 10:
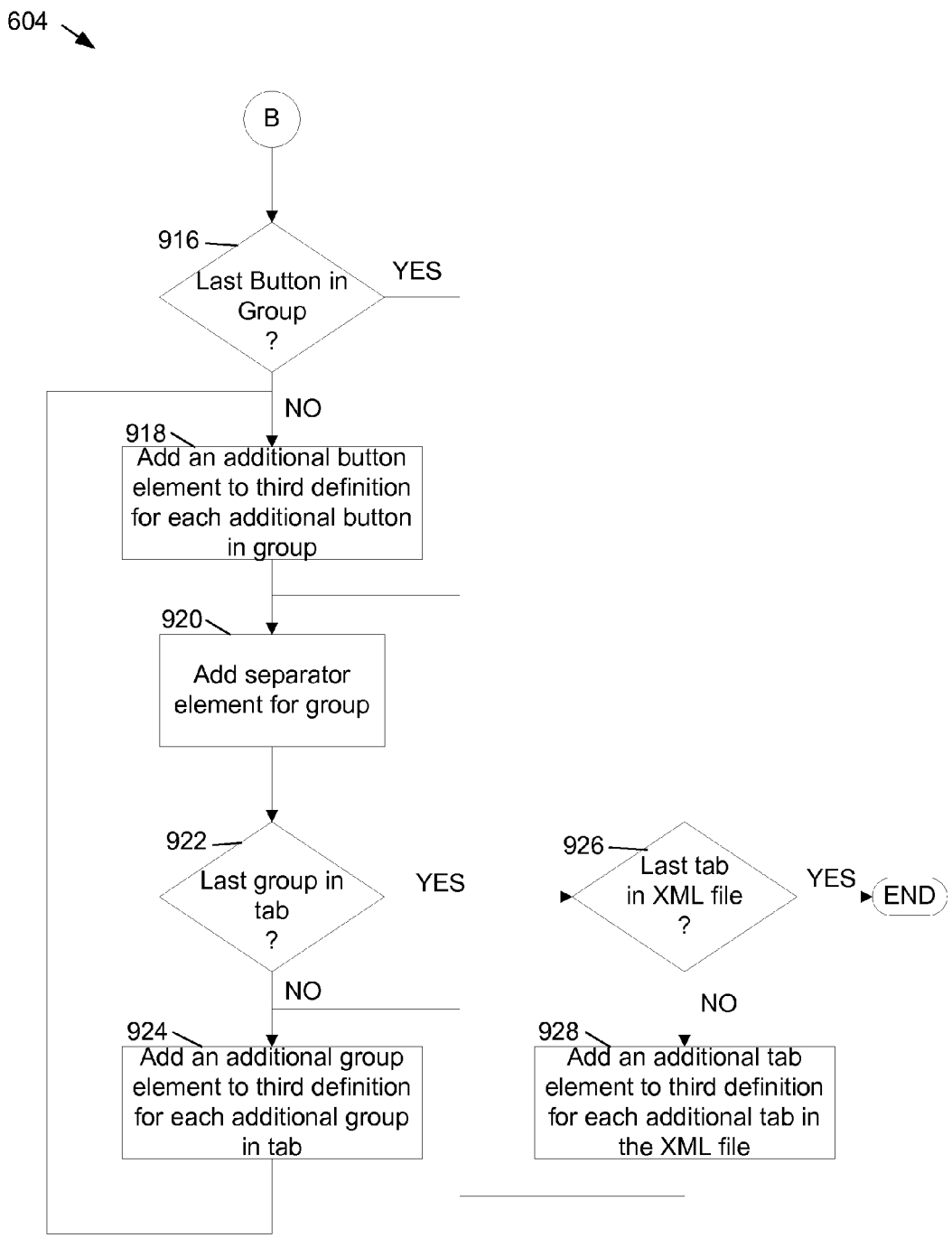

FIGS. 9 and 10 show an example flowchart illustrating additional details of operation 610 for conversion of the second definition to the third definition. As discussed, the second definition corresponds to the format of a ribbon interface for a ribbon that is rendered in the user interface of messaging and collaboration software running on a client computer, such as client computer 104. The third definition corresponds to the format of a command bar interface. A command bar interface is rendered for messaging and collaboration software that does not support a ribbon interface, for example the Microsoft Office Outlook® 2007 messaging and collaboration software running on client computer 106.

In the system and methods of the present disclosure, the first definition is first converted to the second definition and when required, for example when the messaging and collaboration software running on a client computer does not support a ribbon interface, a second conversion process converts the second definition to the third definition. Using two conversion processes permits the same conversion software to be used for messaging collaboration software that supports a ribbon interface and messaging and collaboration software that does not support a ribbon interface. In other examples, the first definition, defining a ribbon interface, is converted to the third definition, defining a command bar interface, directly using only one conversion. When the third definition is executed, for example on client computer 1006, the object model in the Microsoft Office Outlook® 2007 messaging and collaboration software on client computer 106 creates the command bar interface using the third definition.

The second definition is typically stored in a second XML file on client computer 104. In other examples, the second definition is stored in the first XML file on client computer 104. At operation 902, the second definition is parsed and at operation 904, the first tab tag in the second definition is identified.

At operation 906, the first tab is added as a first menu element in the third definition. For example, the accounts tab 304 from the second definition is rendered as an accounts menu item 404 in the third definition. In this example, the third definition includes a menu tag with an accounts name, corresponding to the tab tag with an accounts name in the second definition.

At operation 908, a first group corresponding to the first tab is identified in the second definition. At operation 910, the first group is added as an element in the third definition. The first group element is added to the third definition within the hierarchy of the first menu element.

At operation 912, a first button corresponding to the first group is identified in the second definition. At operation 914, a first button element is added in the third definition. The first button element is added within the hierarchy of the first group element.

At operation 916, a determination is made as to whether the current button, in this case the first button, is the last button in the first group. At operation 916, when a determination is made that the current button is not the last button in the first group, at operation 918, an additional button element is added to the third definition for each additional button identified in the first group. Each additional button element is added within the hierarchy of the first group element.

At operation 920, when all button elements for the current group, in this case the first group, have been added, a separator element is added for the group. The separator element marks the end of the group. When rendered, the separator element is shown as example separator 416 in example command bar 400.

At operation 922, a determination is made as to whether the current group, in this case the first group, is the last group in the current tab, in this case the first tab. When it is determined that the current group is not the last group in the current tab, at operation 924, an additional group element is added to the third definition for each additional group in the current tab. After each additional group element is added to the third definition, control passed to operation 918 where one or more additional button elements are added to the third definition for each additional group element.

When it is determined at operation 922 that the current group is the last group in the current tab, at operation 926, a determination is made as to whether the current tab is the last tab in the second XML file. When it is determined at operation 926 that the current tab is not the last tab in the second XML file, at operation 928, an additional tab element is added to the third definition file for each additional tab in the XML file. Control then passes to operation 924 where one or more additional group elements are added for each additional tab and control passes to operation 918 where one or more additional button elements are added for each additional group. When it is determined at operation 926 that the current tab is the last tab in the second XML file, the second conversion process ends.

Figure 11:
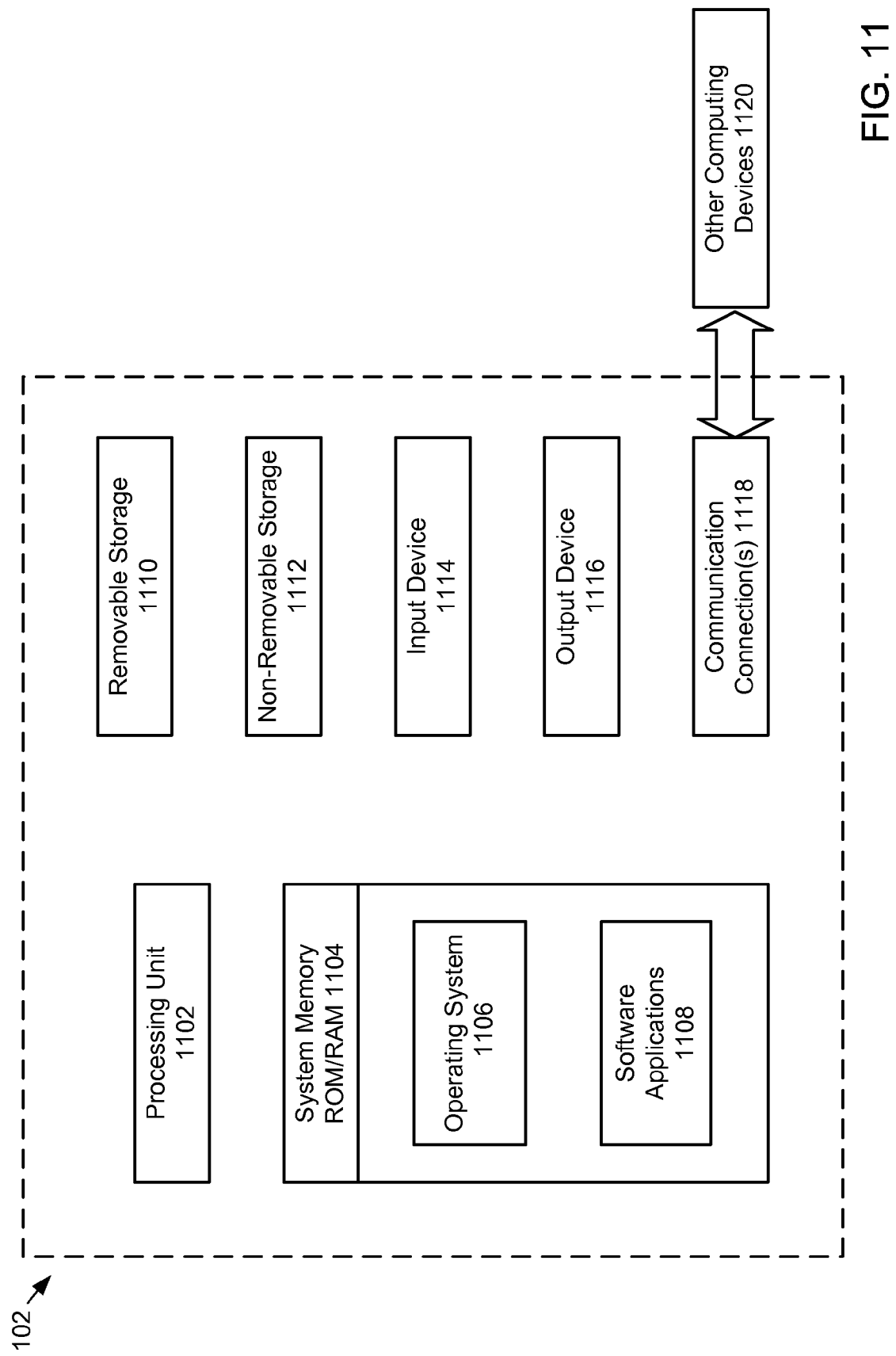
FIG. 11 shows example components of the client computers of FIG. 1.

With reference to FIG. 11, example components of client computer 102 are shown. In example embodiments, the client computer is a computing device. The client computer 102 can include input/output devices, a central processing unit ("CPU"), a data storage device, and a network device. The other client computers 104, 106 and server computers 110, 112 can be configured in a similar manner.

In a basic configuration, the client computer 102 typically includes at least one processing unit 1102 and system memory 1104. Depending on the exact configuration and type of computing device, the system memory 1104 may be volatile (such as RAM), non-volatile (such as ROM, flash memory, etc.) or some combination of the two. System memory 1104 typically includes an operating system 1106 suitable for controlling the operation of a networked personal computer, such as the WINDOWS® operating systems from Microsoft Corporation of Redmond, Wash. or a server, such as Microsoft Exchange Server 2007, also from Microsoft Corporation of Redmond, Wash. The system memory 1104 may also include one or more software applications 1108 and may include program data.

The client computer 102 may have additional features or functionality. For example, the client computer 102 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 11 by removable storage 1110 and non-removable storage 1112. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client computer 102. Any such computer readable storage media may be part of client computer 102. Client computer 102 may also have input device(s) 1114 such as keyboard, mouse, pen, voice input device, touch input device, etc. Output device(s) 1116 such as a display, speakers, printer, etc. may also be included.

The client computer 102 may also contain communication connections 1118 that allow the device to communicate with other computing devices 1120, such as over a network in a distributed computing environment, for example, an intranet or the Internet. Communication connection 1118 is one example of communication media.

Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The various embodiments described above are provided by way of illustration only and should not be construed to limiting. Various modifications and changes that may be made to the embodiments described above without departing from the true spirit and scope of the disclosure.

What is claimed is:

1. A method for implementing a command interface for a software application on a client computer, comprising:
    receiving a first definition of the command interface from a server computer, the first definition including rules for encoding the command interface on a web browser, the command interface including a command structure for executing commands for a first customer relationship management (CRM) application;
    performing a conversion of the first definition to a second definition, the second definition including first language for encoding the command interface on a user interface of an email application on the client computer, the first definition including one or more rule attributes that determine whether one or more elements in the first definition are to be configured to a corresponding element in the second definition, the email application on the client computer including support for a second CRM application that is integrated into the email application;
    determining whether the user interface on the email application on the client computer supports a ribbon interface;
    when it is determined that the user interface on the email application on the client computer supports the ribbon interface, using the second definition to render the command interface as a ribbon on the email application;
    when it is determined that the user interface on the email application does not support the ribbon interface, performing a conversion of the second definition to a third definition, the third definition including second language for encoding the command interface as a command bar on the user interface of the email application; and
    using a command interpreter to process execution of commands selected by a user on the command interface of the email application.

2. The method of claim 1, wherein performing a conversion of the first definition of the command interface to the second definition of the command interface further comprises:
    parsing a first XML file corresponding to the first definition, the first XML file including one or more rule tags, the one or more rule tags including metadata that identify rules for one or more actions;
    identifying a first grouping in the first XML file;
    identifying a first sub grouping associated with the first grouping;
    identifying one or more elements associated with the first sub grouping;
    for each of the one or more elements, determining whether each element is used in the second definition; and
    when it is determined that an element in the one or more elements is to be used in the second definition, obtaining a name of the element, and copying the name of the element to a second XML file for the second definition, the format of the second XML file being different than the format of the first XML file.

3. The method of claim 2, further comprising:
    identifying one or more additional groupings and one or more additional sub groupings in the first XML file;
    for each of the one or more additional sub groupings, identifying one or more additional elements associated with the additional sub grouping;
    for each of the one or more additional elements, determining whether the element is used in the second definition; and when it is determined that an element in the one or more elements is to be used in the second definition, obtaining the name of the element and copying the name of the element to the second XML file.

4. The method of claim 3, wherein performing a conversion of the second definition to the third definition comprises:
parsing a second XML file corresponding to the second definition;
identifying a first tab in the second XML file;
adding a first menu element to a third definition, the first menu element having a name of the first tab;
identifying a first group included in the first tab in the second XML file;
adding a first group element to the third definition, the first group element having a name of the first group, the first group element being included within the hierarchy of the first menu element;
identifying a first button corresponding to the first group in the second XML file; and
adding a first button element to the third XML file, the first button element having the name of the first button, the first button element being included within a hierarchy of the first group element.

5. The method of claim 4, further comprising:
determining whether there are additional buttons in the first group in the second XML file;
when it is determined that there are additional buttons in the first group:
for each additional button in the first group, adding an element for the additional group to the third definition; the name of each button corresponding to the name of each button element, each button element being included within the hierarchy of the first group element; and
after the last additional button element is added to the first group, adding a separator element to the third definition, the separator element following the end of the first group element;
determining whether there are additional groups corresponding the first tab in the second XML file;
when it is determined that there are additional groups corresponding to the first tab, for each additional group corresponding to the first tab:
adding a group element for each additional group to the third definition, the name of each group element corresponding to the name of each additional group, each additional group being included within the hierarchy of the first menu element;
identifying one or more buttons corresponding to each additional group;
adding a button element for each of the one or more buttons corresponding to each additional group, the name of each button element corresponding to the name of each additional button, each additional button element being included within the hierarchy of the group to which each additional button corresponds; and
adding a separator element following each additional group;
determining whether there are additional tabs in the second XML file; and
when it is determined that there are additional tabs in the second XML file, adding a menu element for each of the additional tabs, the name of each additional tab corresponding to the name of the corresponding menu element.

6. The method of claim 1, wherein the command interpreter uses JavaScript.

7. The method of claim 1, wherein the client computer receives periodic updates of the first definition of the command interface from the server computer.

8. A client computing device comprising a processing unit and system memory, the client computing device including instructions that, when executed by the processing unit, cause the client computing device to:
install computer software that integrates a first customer relationship management (CRM) software application into a user interface of an email application that runs on the client computing device;
configure the client computing device to obtain a name and a location of a server computer that includes CRM information;
receive a first definition of a command interface from the server computer, the first definition including first language for encoding the command interface on a web browser, the command interface including a command structure for executing commands for the first CRM software application;
perform a conversion of the first definition to a second definition, the second definition including first language for encoding the command interface on a user interface of the email application on the client computing device, the first definition including one or more rule attributes that determine whether one or more elements in the first definition are to be configured to a corresponding element in the second definition, the email application including support for a second CRM software application that is integrated into the email application;
determine whether the user interface of the email application supports a ribbon interface;
when it is determined that the user interface on the email application supports the ribbon interface, use the second definition to render the command interface as a ribbon on the email application;
when it is determined that the user interface on the email application does not support the ribbon interface, perform a conversion of the second definition to a third definition, the third definition including second language for encoding the command interface as a command bar on the user interface of the email application; and
use a command interpreter to process execution of commands selected by a user on the command interface of the email application.

9. The computing device of claim 8, wherein the command interpreter uses JavaScript.

10. A computer-readable storage medium comprising instructions that, when executed by a client computer, cause the client computer to:
receive a first definition of a command interface from a server computer, the first definition including rules for encoding the command interface on a web browser, the command interface including a command structure for executing commands for a first customer relationship management (CRM) software application;
perform a conversion of the first definition to a second definition, the second definition including first language for encoding the command interface on a user interface of an email application on the client computer, the first definition including one or more rule attributes that determine whether one or more elements in the first definition are to be configured to a corresponding element in the second definition, the email application including support for a second CRM software application that is integrated into the email application;

determine whether the user interface on the email application supports a ribbon interface;

when it is determined that the user interface on the email application supports the ribbon interface, use the second definition to render the command interface as a ribbon on the email application;

when it is determined that the user interface on the email application does not support the ribbon interface, perform a conversion of the second definition to a third definition, the third definition including second language for encoding the command interface as a command bar on the user interface of the email application; and use a command interpreter to process execution of commands selected by a user on the command interface of the email application.

\* \* \* \* \*